United States Patent Office 3,412,089
Patented Nov. 19, 1968

3,412,089
MANUFACTURE OF 4,4'-DIBENZOXAZOL-2-YL STILBENE
Masaaki Ohkawa, Toyonaka-shi, and Tadao Konoshita, Nishinomiya-shi, Japan, assignors to Sumitomo Chemical Company, Ltd., Osaka, Japan, a corporation of Japan
No Drawing. Filed Sept. 16, 1964, Ser. No. 397,001
Claims priority, application Japan, Sept. 18, 1963, 38/50,130; Oct. 19, 1963, 38/56,485; Nov. 21, 1963, 38/62,715
6 Claims. (Cl. 260—240)

This invention relates to the method for producing optical brightening agents. More particularly, it relates to the method for producing 4,4'-di[benzoxazolyl-(2)]-stilbene compounds having the following formula,

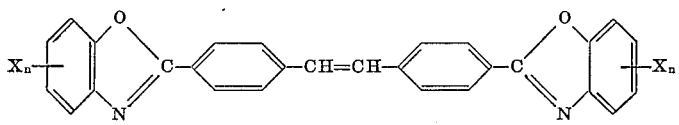

wherein each X is a member selected from the group consisting of hydrogen and halogen atoms, alkyl and aryl radicals, and $n$ is an integer of 1 to 4 inclusive.

The compounds represented by the formula as described above and having the structure of 4,4'-disubstituted stilbene connected with benzoxazole rings in the both ends, are valuable optical whitening agents for polyolefins (particularly for polyethylene and polypropylene fibers and shaped articles) and polyethylene terephthalate textile fibers, having superior fastness to light and remarkable whiteness-increasing effect when applied in the dispersed state. Further, they can be applied for whitening of thermoplastic synthetic resins, by blending in a small amount, imparting extremely superior whiteness-increasing effect to the resins, due to the heat stability at such a high temperature as 300° C.

The present inventors have made broad researches on the production of the present compounds and discovered that the present benzoxazole compounds can be produced in high yield and in one step by the reaction between a 4,4'-stilbenedicarboxylic acid or its lower alkyl ester and an ortho-hydroxyphenylamine or an ortho-lower alkoxyphenylamine by heating in the presence of a dehydrated phosphoric acid, and that reaction product between 4,4'-stilbenedicarboxylic acid dihalide and an ortho-hydroxyphenylamine or an orthoalkoxyphenylamine can be converted in good yield to a benzoxazole derivative through ring formation by heating in the presence of a dehydrated phosphoric acid.

One object of the present invention is to provide the advantageous process for producing optical brightening agents comprising 4,4' - di - [benzoxazolyl-(2)]-stilbene compounds, for polyolefin fibers and shaped article and polyethylene terephthalate textile fibers.

Other objects would be apparent from the following description.

In order to accomplish these objects, the present invention provides a method for producing 4,4'-di-[benzoxazolyl-(2)]-stilbene compounds having the following formula,

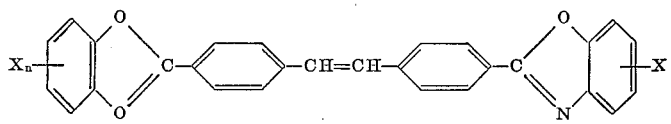

wherein each X is a member selected from the group consisting of hydrogen and halogen atoms, alkyl and aryl radicals, and $n$ is an integer of 1 to 4 inclusive, which comprises heating a member selected from the group consisting of 4,4'-stilbenedicarboxylic acid and di-lower alkyl 4,4'-stilbenedicarboxylate with a member selected from the group consisting of ortho-hydroxyphenylamines and ortho-lower alkoxyphenylamines in the presence of a dehydrated phosphoric acid.

Further, the present invention provides a method for producing 4,4'-di-[benzoxazolyl-(2)]-stilbene compounds having the following formula,

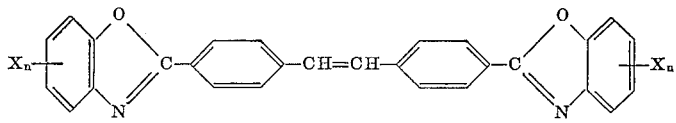

wherein each X is a member selected from the group consisting of hydrogen and halogen atoms, alkyl and aryl radicals, and $n$ is an integer of 1 to 4 inclusive, which comprises heating an acylamide compound having the following formula,

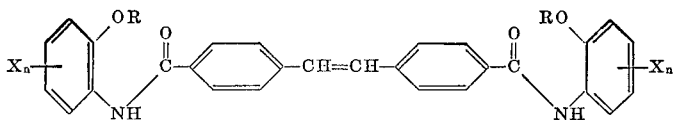

wherein each X and $n$ have the same meanings as identified above, and R is a member selected from the group consisting of hydrogen atom and lower alkyl radicals, in the presence of a dehydrated phosphoric acid.

Still further, the present invention provides a method for producing 4,4'-di-[benzoxazolyl-(2)]-stilbene compounds having the following formula,

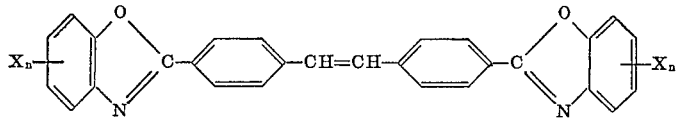

wherein each X is a member selected from the group consisting of hydrogen and halogen atoms, and alkyl and aryl radicals, and $n$ is an integer of 1 to 4 inclusive, which comprises, in the first step, heating a 4,4'-stilbenedicarboxylic acid dihalide compound of the formula:

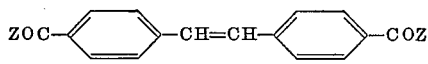

wherein Z represents an atom selected from the group consisting of chlorine and bromine, with a member selected from the group consisting of ortho-hydroxyphenylamines and ortho-lower alkoxyphenylamines in an inert solvent to yield an acylamide compound having the formula,

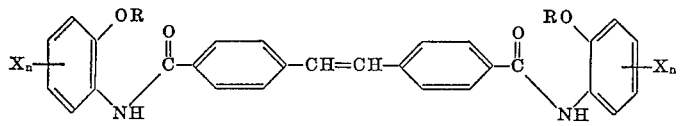

wherein each X and $n$ have the same meanings as identified above, and R is a member selected from the group consisting of hydrogen atom and lower alkyl radicals; in the second step, heating the said acylamide in the presence of a dehydrated phosphoric acid.

It is already known that 1,2-di-[oxazolyl-(2)]-ethylene compounds are produced by the direct reaction of fumaric acid and an ortho-hydroxyarylamine.

However in the case where 4,4'-stilbenedicarboxylic acid is applied instead of fumaric acid in the above direct reaction, the conversion is low and it is not satisfactory in the industrial point of view. The present inventors have made broad researches on the improvement of the reaction between 4,4'-stilbenedicarboxylic acid and ortho-hydroxyphenylamines or ortho-lower alkoxyphenylamines and found that the low conversion in the case of using 4,4'-stilbenedicarboxylic acid is due to the facts that 4,4'-stilbenedicarboxylic acid has so high melting point that it is not possible to carry out the melting method without using solvent, and that the 4,4'-stilbenedicarboxylic acid is extremely insoluble in an organic solvent. Upon the such findings, they have reached the present invention. Namely, 4,4'-di-[benzoxazolyl-(2)]-stilbene compounds are obtained surprisingly in nearly quantitative yield by heating 4,4'-stilbenedicarboxylic acid and an ortho-hydroxyphenylamine or an ortho-lower alkoxyphenylamine in the presence of a dehydrated phosphoric acid especially pyrophosphoric acid, a polyphosphoric acid or metaphosphoric acid.

Observing the situation of the present reaction, above-described dehydrated phosphoric acids become preferable solvent to 4,4'-stilbenedicarboxylic acid and the reaction mixture turns to a solution.

The reasons why such high yield is attained are that the reaction mixture become homogeneous due to the fact that the dehydrated phosphoric acids play role as a solvent, and that the dehydrated phosphoric acids act as the dehydrating catalyst at the same time, and so on. In addition to the above reasons, it has significant meanings for the high yield that the raw materials, ortho-hydroxyphenylamines or ortho-lower alkoxyphenylamines and 4,4'-stilbenedicarboxylic acid and the products 4,4'-di-[benzoxazolyl-(2)]-stilbene compounds are stable at the present reaction condition.

In the method of ring formation by dehydration of the acylamide compounds prepared by condensing a 4,4'-stilbenedicarboxylic acid dihalide and an ortho-lower alkoxyphenylamine, in the presence of a dehydrated phosphoric acid, the condensation reaction and the ring formation reaction may be conducted even in the presence of air without any ill effect such as that the product contains tarry matter impurities or the undesirable coloring of the product. This is another advantage of the invention.

The present method of dehydrative ring formation of the acylamide compound does not apply with good result to the acyl amides obtained by using aliphatic carboxylic acid halide instead of the stilbenedicarboxylic acid dihalide.

This is considered to be due to the fact that the oxazole ring formation proceeds accompanying the breakage of the bond of aliphatic acylamide at the present ring formation condition, because the strength of the chemical bond of the aliphatic acylamides are weaker than that of the aromatic acylamides.

In carrying out the present invention, 4,4'-stilbenedicarboxylic acid or its di-lower alkyl ester is heated with an ortho-hydroxyphenylamine or an ortho-lower alkoxyphenylamine together with a dehydrated phosphoric acid, to yield a 4,4'-di-[benzoxazolyl-(2)]-stilbene compound, in one step.

The mole ratio of 4,4'-stilbenedicarboxylic acid or its di-lower alkyl ester to an ortho-hydroxyphenylamine or an ortho-lower alkoxyphenylamine is preferably 1:2 and the amount of the phenylamine compounds may be a little increased or decreased without affecting the reaction. However, the use of a great excess amount of the phenylamine is not preferable because it brings about the undesirable coloring of the objective products.

The stilbene compounds used in the present invention include 4,4'-stilbenedicarboxylic acid itself and its di-loweralkyl esters such as dimethyl 4,4'-stilbenedicarboxylate, diethyl 4,4'-stilbenedicarboxylate, dipropyl-4,4'-stilbenedicarboxylate and di-n, iso- and tert.-butyl-4,4'-stilbenedicarboxylates.

Typical examples of the ortho-hydroxyphenylamine and the ortho-lower alkoxyphenylamine include, 1-amino-2-hydroxy-benzene,
1-amino-2-hydroxy-5-methylbenzene,
1-amino-2-hydroxy-4-methylbenzene,
1-amino-2-hydroxy-6-methylbenzene,
1-amino-2-hydroxy-3,5-dimethylbenzene,
1-amino-2-hydroxy-5-tert.-butylbenzene,
1-amino-2-hydroxy-5-chlorobenzene,
1-amino-2-hydroxy-5-phenylbenzene,
1-amino-2-methoxybenzene,
1-amino-2-ethoxybenzene,
1-amino-2-methoxy-5-methylbenzene,
1-amino-2-methoxy-5-chlorobenzene,
1-amino-2-methoxy-4-methylbenzene,
1-amino-2-methoxy-5-tert.-butylbenzene,
1-amino-2-methoxy-5-phenylbenzene and the like. In the above examples, there are many which are generally utilized as intermediate for dyestuffs.

As the dehydrated phosphoric acids used in the present invention, pyrophosphoric acid, polyphosphoric acid, metaphosphoric acid and phosphoric acid anhydride may be utilized. Because the dehydrated phosphoric acids act also as the reaction medium, it is preferable to employ pyro-, poly- and metaphosphoric acids, these having a high dissolving ability to 4,4'-stilbenedicarboxylic acid or its lower alkyl ester. When anhydrous phosphoric acid or 85% phosphoric acid is employed, a part of 4,4'-stilbenedicarboxylic acid or its lower alkyl ester remains undissolved at the beginning of the reaction, but as the reaction temperature is raised, water is separated, so finally the reaction can be conducted in the homogeneous condition by driving the water out of the reaction system.

The reaction proceeds when the amount of the dehydrated phosphoric acid employed is more than equivalent weight of the mixture of the stilbene compound with the phenylamine compound and is sufficient for the stirring of the reaction mixture.

But the dehydrated phosphoric acid employed gives better results when it is used in an amount of more than 5 times preferably about 10 times weight of the mixture of the stilbene compound with the phenylamine compound.

When the dehydrated phosphoric acid in an amount of more than 10 times weight of the mixture of the stilbene compound with the phenylamine compound is employed, the reaction proceeds well but there is no additional effect as compared with the case when it is employed in an amount of about 5 to 10 times.

The reaction may be conducted at a temperature between 150° C. and 240° C., but a temperature between 200° C. and 230° C. is preferable.

The reaction is conducted for about 3 to 10 hours.

In the case of employing an ortho-lower alkoxyphenylamine, the reaction is more effectively conducted by adding small amount of iodine or potassium iodide (for example an amount of 0.1 mol. per mole of 4,4'-stilbene dicarboxylic acid) to accelerate the reaction.

After the reaction is over, the reaction mixture is cooled and added with a large amount of water to separate the objective compound, followed by filtration, and washing with water and with an aqueous dilute alkali solution, which may be hot if desired, and again with water and dried.

When an ortho-hydroxyphenylamine is employed, it is preferable to exclude oxygen gas out of the reaction system for the purpose of preventing the undesirable coloring caused by the oxidation during the reaction, for that reason it gives good result to carry out the reaction in an atmosphere of an inactive gas such as carbon dioxide gas and nitrogen gas.

When an ortho-lower alkoxyphenylamine is employed, it is needless to conduct the reaction in an atmosphere of inert gas as described above.

In carrying out the other method of the present invention, a 4,4'-stilbenedicarboxylic acid dihalide which is obtained by halogenating 4,4'-stilbenedicarboxylic acid is in the first step reacted with an ortho-hydroxyphenylamine or an ortho-lower alkoxyphenylamine to yield an acylamide compound of the formula,

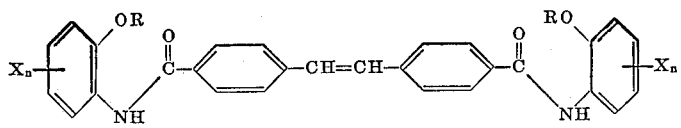

wherein each X, n and R have the same meanings as identified above. As the halide compounds, dichloride and dibromide are utilized in which dichloride is preferable. The typical examples of the ortho-hydroxyphenylamine and the ortho-lower alkoxyphenylamine are as described above.

The condensation reaction of an ortho-hydroxyphenylamine or an ortho-lower alkoxyphenylamine with 4,4'-stilbenedicarboxylic acid dihalide is effectively conducted in an inert solvent such as benzene, toluene, xylene and chlorobenzene.

When ortho-hydroxyphenylamine is used, it is necessary to carry out the condensation reaction in an atmosphere of an inactive gas such as carbon dioxide gas and nitrogen gas, for the purpose of preventing the oxydation of the ortho-hydroxyphenyl amine at the high temperature of the reaction.

The condensation reaction to yield the acylamide compound is ordinarily conducted at about 80°–140° C. for about 4–5 hours.

After the reaction is over, the acylamide compound is separated by filtration and washed with a small amount of a solvent and dried.

In the second step, an acylamide compound of the general formula,

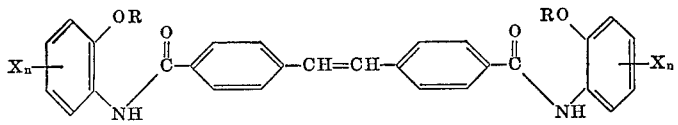

wherein each X, n and R have the same meanings as identified above, is subjected to a dehydration reaction to yield a benzoxazole derivative having the general formula,

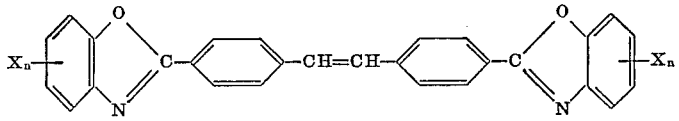

wherein each X and n have the same meanings as identified above. The dehydrative ring formation reaction is conducted by heating the acylamide compound with a dehydrated phosphoric acid with stirring.

The dehydrated phosphoric acid compounds used is as described above, and in this process especially polyphosphoric acid is preferable. The amount of the dehydrated phosphoric acid used is 1 to 20 times preferably 5 to 10 times weight of the acylamide.

The benzoxazole ring formation reaction can be preferably proceeded by use of e.g. polyphosphoric acid, but in the case of employing an ortho-lower alkoxyphenylamine, if small amount of iodine or potassium iodide is added to the reaction mixture as catalyst, the result is better. The reaction temperature is between 150° and 200° C. preferably 160° and 180° C. The reaction is conducted for 3 to 10 hours, preferably for 7 hours.

After about 7 hours of the continuation of the reaction, the reaction mixture is charged into water and the insoluble part is separated by filtration and washed with water, with aqueous alkali solution and again with water to obtain the objective product.

The products obtained according to the present invention is beautiful pale yellow or yellow crystals and is almost free from impurities.

The stilbenedibenzoxazole compounds obtained according to the present invention can be well utilized without purification as the optical brightening agent. If further purification is conducted, it will be advantageous to employ the sulfuric acid recrystallization method.

It is difficult to carry out the recrystallization by use of an ordinary solvent for recrystallization such as dimethylformamide, dioxane and pyridine, unless it is used in an amount more than 300 times by weight.

In the sulfuric acid recrystallization method, crude product is dissolved in concentrated sulfuric acid in an amount of about 25–30 times by weight at a temperature below 30° C., and stirred for about one hour. And then the solution is added portion-wise with water while being kept at a low temperature. When the solution is diluted to sulfuric acid concentration of 70–80%, bright yellow to brownish yellow crystals come to precipitate, which are separated by filtration. The crystals are washed with a 70–80% sulfuric acid and then suspended in water and well stirred, followed by filtration and washing with water until the filtrate becomes neutral.

4,4′ - di - [benzoxazolyl-(2)]-stilbene compounds are pale yellow or yellow crystals and have strong yellow fluorescence under ultraviolet light. They are almost insoluble in dimethylformamide, dioxane and pyridine, and the solution partially dissolved in these solvents are almost colorless and show bluish purple fluorescence even under natural light.

The following examples are given in order further to illustrate the invention, but without being limited thereto. In examples, all parts are by weight, unless otherwise identified.

Example 1

Twenty one point eight parts of 1-amino-2-hydroxybenzene, 26.8 parts of 4,4′-stilbenedicarboxylic acid and 500 parts of polyphosphoric acid ($P_2O_5$ 84%) are charged into a reaction vessel and passing nitrogen gas, the reaction mixture is heated at 220° C. for 8 hours while stirring. The color of reaction mixture changes to dark green from green at beginning and finally to black green. A part of the product crystallizes out as the yellow crystals around the reactor as the reaction proceeds.

After the reaction, the reaction mixture is cooled to 100° C. and gradually added with 1000 parts of water. After stirring of 30 minutes, the product is separated by filtration and washed with water. Then, the crystals are heated with 500 parts of 3% aqueous sodium hydroxide solution and filtered. After washed with water and dried, 39.5 parts of yellow crystals of 4,4′-di-[benzoxazolyl-(2)]-stilbene having the formula,

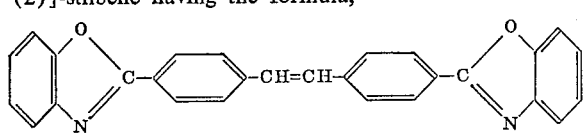

is obtained.

Using thus obtained compound in the state of aqueous dispersion, a polypropylene cloth can be dyed in good whiteness with high fastness to light.

In this example, using 32.4 parts of diethyl 4,4′-stilbenedicarboxylate instead of 4,4′-stilbenedicarboxylic acid, the same result is obtained.

Example 2

Twenty four point six parts of 1-amino-5-methyl-2-hydroxybenzene, 26.8 parts of 4,4′-stilbenedicarboxylic acid and 500 parts of metaphosphoric acid are charged into a reaction vessel and heated at 220°–230° C. for 8 hours, while passing nitrogen gas and stirring. The reaction mixture which is yellowish green at the beginning changes to greenish brown and finally to dark brown. After the reaction, the reaction mixture is allowed to cool. When about 120° C. is reached, it is gradually added with water while stirring. Total 1000 parts of water is added and stirring is continued.

As in the preceding procedure, when metaphosphoric acid is employed and if the reaction mixture is sufficiently cooled after the reaction, the reaction mixture solidifies, so it is troublesome to crystallize out by adding water. After filtration, washed with water, treated with a dilute aqueous alkali solution, filtered, again washed with water and dried, 42.5 parts of pale yellow colored crystals of 4,4′-di-[5-methylbenzoxazolyl-(2)]-stilbene having the formula,

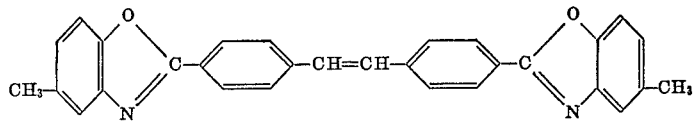

is obtained.

Using thus obtained compound in the state of aqueous dispersion, a polypropylene cloth can be dyed in good whiteness with high fastness to light.

Example 3

Twenty eight point seven parts of 1-amino-5-chloro-2-hydroxybenzene, 26.8 parts of 4,4′-stilbenedicarboxylic acid and 500 parts of pyrophosphoric acid are charged into a reaction vessel and heated at 230°–240° C. while passing nitrogen gas and stirring. At the beginning of the reaction, 4,4′-stilbenedicarboxylic acid is suspended and before long it dissolves in green color. After the reaction, 1000 parts of water is added to the reaction mixture, and the precipitate is filtered. Treating as in the Example 1, 34.1 parts of light brown colored crystals of 4,4′-di-[5-chlorobenzoxazolyl-(2)]-stilbene having the formula,

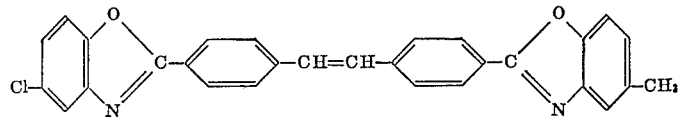

is obtained.

Example 4

Twenty one point eight parts of 1-amino-2-hydroxybenzene, 26.8 parts of 4,4′-stilbenedicarboxylic acid and 500 parts of 85% phosphoric acid are charged into reaction vessel and heated while passing nitrogen gas and stirring. On heating at 200° C. for 2 hours, the reaction mixture yields water in almost whole part of which is allowed to be distilled out.

Then the reaction mixture is heated at 230°–240° C. for 8 hours while stirring. After the reaction, 1000 parts of water is added thereto, thereby crystals are isolated out. Thus obtained crystals are treated as in Example 1, and 26.0 parts of 4,4′-di-[benzoxazolyl-(2)]-stilbene is obtained.

Example 5

Thirty seven point zero parts of 1-amino-2-hydroxy-5-phenylbenzene, 26.8 parts of 4,4′-stilbenedicarboxylic acid and 500 parts of polyphosphoric acid ($P_2O_5$ 84%) are charged into a reaction vessel and heated at 220° C. for 8 hours, while passing nitrogen gas and stirring. The reaction mixture is green colored suspension at the beginning of the reaction, and finally become fluid liquid having dark black green color, more and more increasing the transparency. After the reaction, the reaction mixture is allowed to cool, and added with 1000 parts of water, thereby the reaction product is isolated out as the brown crystals. After stirring for about 30 minutes, the mixture is filtered and washed with water. Then the crystals are suspended in a 3% aqueous sodium hydroxide solution and heated. After the suspension is filtered, well washed with water and dried. Thus 52.3 parts of 4,4'-di-[5-phenyl-benzoxazolyl-(2)]-stilbene having the formula,

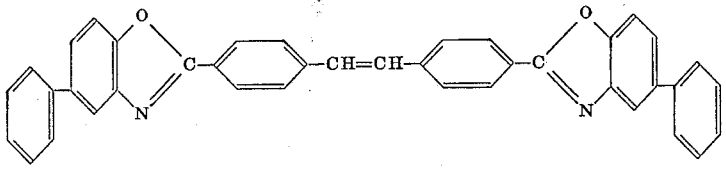

is obtained.

Example 6

In similar way as described in Example 1, the following 4,4'-di-[oxazolyl-(2)]-stilbene compounds corresponding to the phenylamine employed are obtained.

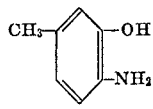

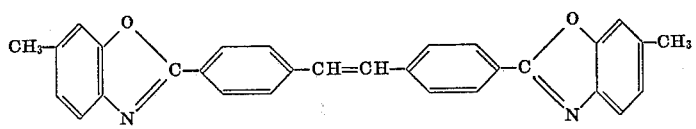

4,4'-di-[6-methylbenzoxazolyl-(2)]-stilbene

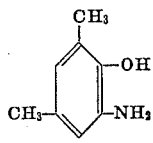

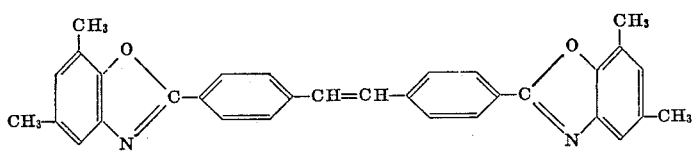

4,4'-di-[5,7-dimethylbenzoxazolyl-(2)]-stilbene

Example 7

Twenty six point eight parts of finely divided 4,4'-stilbenedicarboxylic acid, 24.6 parts of 1-amino-2-methoxy-benzene, 350 parts of polyphosphoric acid ($P_2O_5$ 84%) and 0.2 part of potassium iodide are charged into a reaction vessel and heated at 200° C. for 6 hours. The reaction mixture changes from yellow to dark brown color during the reaction. After the reaction, the reaction mixture is allowed to cool and added with 1000 parts of water and stirred. After stirring for 1 hour, the precipitates are collected by filtration washed with water and then suspended in 1000 parts of 3% aqueous sodium hydroxide solution. After stirring for 1 hour at 80° C., the suspension is filtered and wsahed with water and dried. Thus 40.0 parts of yellow crystals of 4,4'-di[benzoxazolyl-(2)]-stilbene having the formula,

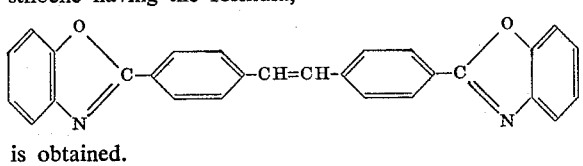

is obtained.

When the reaction is conducted employing 27.4 parts of 1-amino-2-ethoxybenzene instead of 1-amino-2-methoxybenzene in this example, similar result is obtained. When the reaction is conducted employing 32.4 parts of diethyl 4,4'-stilbenedicarboxylate instead of 4,4'-stilbenedicarboxylic acid in this example, similar result is also obtained.

Example 8

Twenty six point eight parts of finely divided 4,4'-stilbenedicarboxylic acid, 27.4 parts of 1-amino-2-methoxy-5-methylbenzene and 350 parts of metaphosphoric acid are charged into a reaction vessel and heated at 200° C. for 6 hours while stirring. The reaction mixture changes from yellow to dark brown color during the reaction. After the reaction, the reaction mixture is allowed to cool while stirring, and gradually added with water when the temperature lowered to about 120° C., and stirring is continued. After total 1000 parts of water is added, stirring is continued for additional 1 hour.

After the reaction, reaction mixture is filtered, washed with water, suspended in a 3% aqueous sodium hydroxide solution, and stirred for 1 hour at 80° C. then filtered, washed with water and dried. Thus, 44.0 parts of yellow crystals of 4,4'-di-[methylbenzoxazolyl-(2)]-stilbene having the formula,

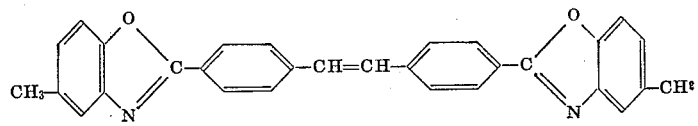

is obtained.

Example 9

Twenty six point eight parts of finely divided 4,4'-stilbenedicarboxylic acid, 31 parts of 1-amino-2-methoxy-5-chlorobenzene and 350 parts of polyphosphoric acid ($P_2O_5$ 84%) are charged into a reaction vessel and reacted as in Example 7 to yield 47.0 parts of 4,4'-di[5-chlorobenzoxazolyl-(2)]-stilbene having the formula,

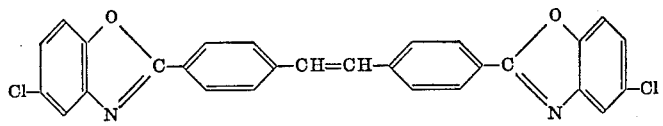

is obtained.

Example 10

Twenty six point eight parts of finely divided 4,4'-stilbenedicarboxylic acid, 24.6 parts of 1-amino-2-methoxybenzene, 500 parts of pyrophosphoric acid and 0.2 part of potassium iodide are charged into a reaction vessel, and heated at 200° C. for 2 hours, and then heated at 220° C.–230° C. for 6 hours while stirring. After the reaction, the reaction mixture is allowed to cool and added with 1000 parts of water and the precipitates are separated by filtration. And then treating as described in Example 7, 20.5 parts of somewhat brown colored 4,4'-di-[benzoxazolyl-(2)]-stilbene is obtained.

Example 11

According to the method described in Example 7, and employing the following 2-lower alkoxyphenylamines, the corresponding 4,4'-di-benzoxazolyl-(2)-stilbene compounds as represented below are obtained.

Example 12

A mixture of 100 parts of chlorobenzene, 24.6 parts of 1-amino-2-methoxybenzene, and 30.5 parts of 4,4'-stilbenedicarboxylic acid dichloride is heated at the boiling point of chlorobenzene for 4 hours, while stirring. After the reaction, the reaction mixture is cooled and filtered to separate the precipitated crystals. Thus, 42 parts of the acylamide compound having the formula,

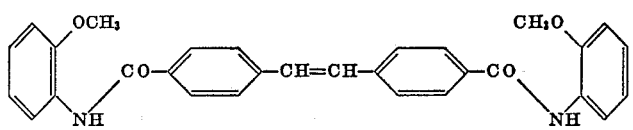

is obtained.

Ten parts of the acylamide compound described above, is heated with 100 parts of polyphosphoric acid ($P_2O_5$ 84%) and 0.5 part of potassium iodide at 180° C. for 10 hours, while stirring. It is necessary to take care, as foaming reaction occurs at the beginning of the reaction.

The reaction mixture changes from yellow to brownish yellow color during the reaction. After the reaction, the reaction mixture is cooled and charged into 500 parts of water and stirred for 1 hour and filtered to separate the precipitates. The precipitates are washed with water, suspended in 500 parts of a 3% aqueous sodium hydroxide solution and stirred for 1 hour at 80° C. and then filtered, washed with water and dried. Thus 6.3 parts of yellow

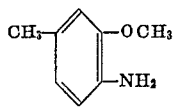

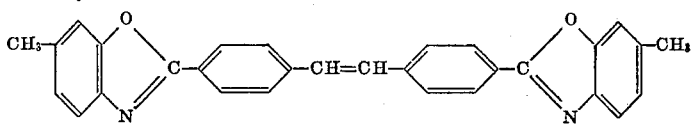

4,4'-di-[6-methylbenzoxazolyl-(2)]-stilbene

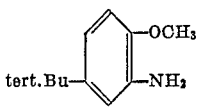

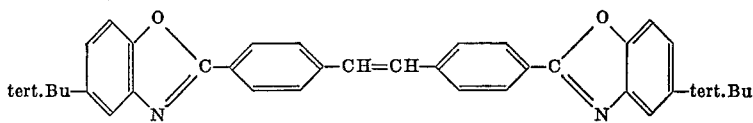

4,4'-di-[5-tert.-butylbenzoxazolyl-(2)]-stilbene

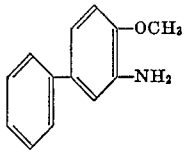

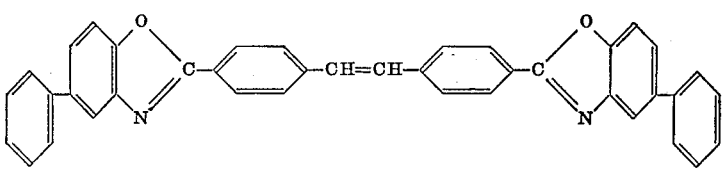

4,4'-di-[5-phenylbenzoxazolyl-(2)]-stilbene crystals of 4,4'-di-[benzoxazolyl-(2)]-stilbene having the formula,

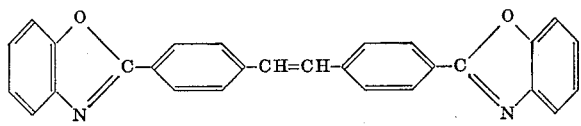

is obtained.

When 27.5 parts of 1-amino-2-ethoxybenzene is employed instead of 1-amino-2-methoxybenzene in this example, 42.5 parts of the acylamide compound having the formula,

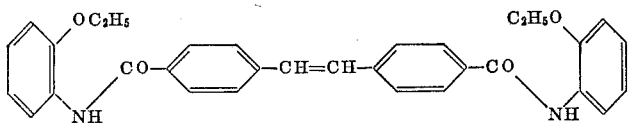

is obtained.

This acylamide compound is converted to 4,4'-di[benzoxazolyl-(2)]-stilbene as described above.

Example 13

In similar way as described in Example 12, employing 27.5 parts of 1-amino-2-methoxy-5-methylbenzene and 30.5 parts of 4,4'-di-stilbenedicarboxylic acid and dichloride, 41.5 parts of the acylamide compound having the formula,

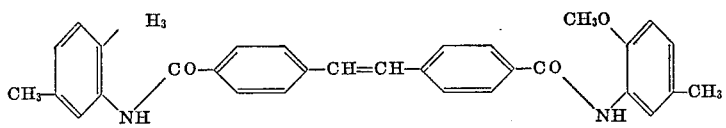

is obtained.

Ten parts of this acylamide compound is heated with 100 parts of metaphosphoric acid at 180°C. for 10 hours, while stirring. After the reaction, treating the reaction mixture as described in Example 12, 6.5 parts of 4,4'-di-[5-methyl-benzoxazolyl-(2)]-stilbene having the formula,

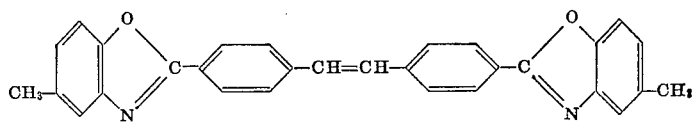

is obtained.

When 1-amino-2-methoxy-5-chlorobenzene is employed instead of 1-amino-2-methoxy-5-methylbenzene in this example, 4,4'-di-[5-chlorobenzoxazolyl-(2)]-stilbene having the formula,

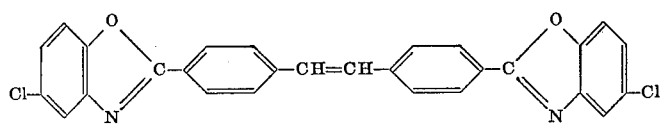

is obtained.

Example 14

A mixture of 100 parts of monochlorobenzene and 12.3 parts of 1-amino-2-hydroxy-5-methylbenzene is heated at 120° C. while stirring in an atmosphere of nitrogen gas. Thereto, 15.2 parts of 4,4'-stilbenedicarboxylic acid dichloride is added within 10 minutes and the mixture is subjected to the reaction under reflux for 4 hours. After cooling to room temperature, the reaction mixture is filtered to yield 21.5 parts of acylamide compound having the formula,

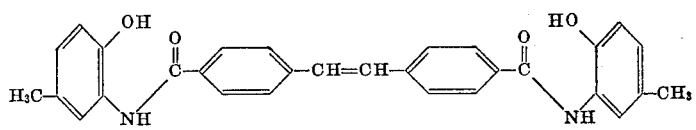

Elementary analysis is as follows.—Calcd.: C, 75.3; H, 5.44; N, 5.85%. Found: C, 75.18; H, 5.68; N, 5.80%.

Into a reaction vessel, 10 parts of the acylamide compound obtained as above and 50 parts of polyphosphoric acid ($P_2O_5$ 84%) are charged, and stirred for 4 to 5 hours at a temperature of 180° to 190° C., while passing nitrogen gas thereto.

After the reaction, the reaction mixture is charged into 500 parts of water and stirred at 60° C. to form precipitates, which are collected by filtration.

Thus, 8.5 parts of 4,4'-di-[5-methylbenzoxazolyl-(2)]-stilbene having the formula,

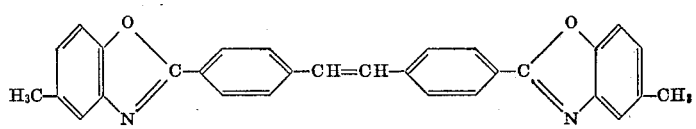

is obtained.

Example 15

Into a reaction vessel, 10 parts of the acylamide compound having the formula,

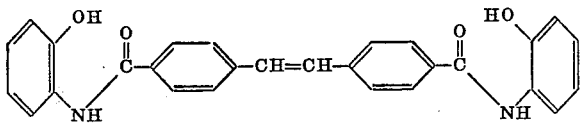

and 50 parts of polyphosphoric acid ($P_2O_5$ 84%) are charged. Thereafter, the mixture is subjected to the reaction according to the method as described in Example 14. Thus 8.3 parts of 4,4'-di-[benzoxazolyl-(2)]-stilbene having the formula,

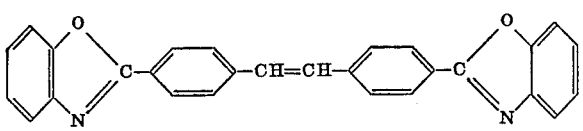

is obtained.

What we claim is:

1. A method for producing 4,4'-di-[benzoxazolyl-(2)]-stilbene compounds having the following formula,

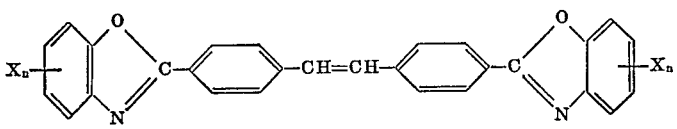

wherein each X is a member selected from the group consisting of hydrogen and halogen atoms, alkyl and aryl radicals, and $n$ is an integer of 1 to 4 inclusive, which comprises heating an acylamide compound having the following formula,

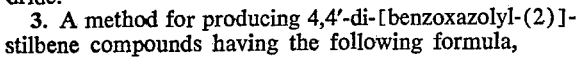
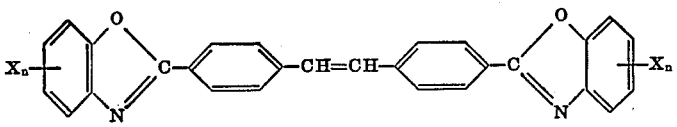

wherein each X and $n$ have the same meanings as identified above, and R is a lower alkyl radical, in the presence of a solvent amount of a dehydrated phosphoric acid.

2. A method according to claim 1, wherein the dehydrated phosphoric acid is a member selected from the group consisting of pyrophosphoric acid, polyphosphoric acids, metaphosphoric acid and phosphoric acid anhydride.

3. A method for producing 4,4'-di-[benzoxazolyl-(2)]-stilbene compounds having the following formula,

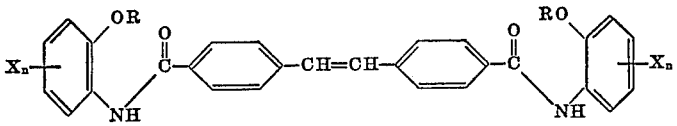

wherein each X is a member selected from the group consisting of hydrogen and halogen atoms, and alkyl and aryl radicals, $n$ is an integer of 1 to 4 inclusive, which comprises, in the first step, heating a 4,4'-stilbenedicarboxylic acid dihalide compound of the formula,

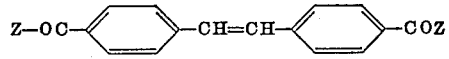

wherein Z represents an atom selected from the group consisting of chlorine and bromine, with an ortho-lower alkoxyphenylamine in an inert solvent to yield an acylamide compound having the formula,

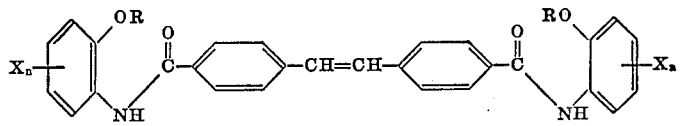

wherein each X and $n$ have the same meanings as identified above, and R is lower alkyl radical; in the second step, heating the said acylamide in the presence of a solvent amount of a dehydrated phosphoric acid.

4. A method according to claim 3, wherein the dehydrated phosphoric acid is a member selected from the group consisting of pyrophosphoric acid, polyphosphoric acids, metaphosphoric acid and phosphoric acid anhydride.

5. A method for producing 4,4'-di-[benzoxazolyl-(2)]-stilbene compound having the following formula,

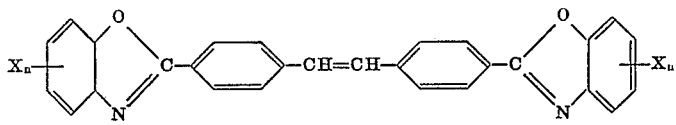

wherein each X is a member selected from the group consisting of hydrogen and halogen atoms, alkyl and aryl radicals, and $n$ is an integer of 1 to 4 inclusive, which comprises heating a member selected from the group consisting of 4,4'-stilbenedicarboxylic acid and di-lower alkyl 4,4'-stilbenedicarboxylates with an ortho-lower alkoxyphenylamine in the presence of a solvent amount of a dehydrated phosphoric acid.

6. A method according to claim 5, wherein the dehydrated phosphoric acid is a member selected from the group consisting of pyrophosphoric acid, polyphosphoric acids, metaphosphoric acid and phosphoric acid anhydride.

(References on following page)

References Cited

UNITED STATES PATENTS

| | | |
|---|---|---|
| 2,985,661 | 5/1961 | Hein et al. |
| 3,133,916 | 5/1964 | Duennenberger et al. |
| 3,260,715 | 7/1966 | Saunders. |

FOREIGN PATENTS

| | | |
|---|---|---|
| 856,319 | 12/1960 | Great Britain. |

OTHER REFERENCES

Derwent: Belgian Patents Report N.D. No. 22, Gp. 2; p. 2 (6/1964), For. Pat. JR 1 (abstract of Belgian Patent 641,426).

JOHN D. RANDOLPH, *Primary Examiner.*